United States Patent [19]
Asano

[11] 3,785,267
[45] Jan. 15, 1974

[54] PHOTOGRAPHIC APPARATUS HAVING BUILT-IN PROCESSOR

[75] Inventor: Yoshio Asano, Nicinomiya, Japan

[73] Assignee: Fuji Photo Film Co., Ltd., Kanagawa, Japan

[22] Filed: Dec. 4, 1972

[21] Appl. No.: 312,006

[30] Foreign Application Priority Data
Dec. 3, 1971 Japan.............................. 46-98200

[52] U.S. Cl. ..................................... 95/89 L, 95/13
[51] Int. Cl. ............................................. G03d 9/00
[58] Field of Search .................... 95/13, 89 R, 89 L, 95/90.5

[56] References Cited
UNITED STATES PATENTS

| | | | |
|---|---|---|---|
| 2,587,350 | 2/1952 | Maiwald........................ | 95/89 R X |
| 2,665,619 | 1/1954 | Tuttle et al. ...................... | 95/13 X |
| 2,966,103 | 12/1960 | Erikson.................................. | 95/13 |
| 3,090,290 | 5/1963 | Ross..................................... | 95/89 R |
| 3,270,642 | 9/1966 | Nerwin ................................. | 95/13 |
| 3,483,809 | 12/1969 | Schmidt et al.................. | 95/89 R X |

FOREIGN PATENTS OR APPLICATIONS
1,172,951   6/1964   Germany............................ 95/89 R

*Primary Examiner*—Fred L. Braun
*Attorney*—Richard C. Sughrue et al.

[57] ABSTRACT

A developer solution supplying device is made independently of the camera body and integrally fixed to a spool for feeding out a positive image forming paper. The unit of the solution supplier and the posi-paper spool is demountably attached to the camera body. The developer solution supplying device is operable from outside the camera by operating two manual operating members. The posi-paper is provided with a number of solution containers for the respective images which are filled one by one with the developer solution as the paper advances by pulling the paper with the negative film out of the camera.

7 Claims, 8 Drawing Figures

PATENTED JAN 15 1974
3,785,267
SHEET 1 OF 3
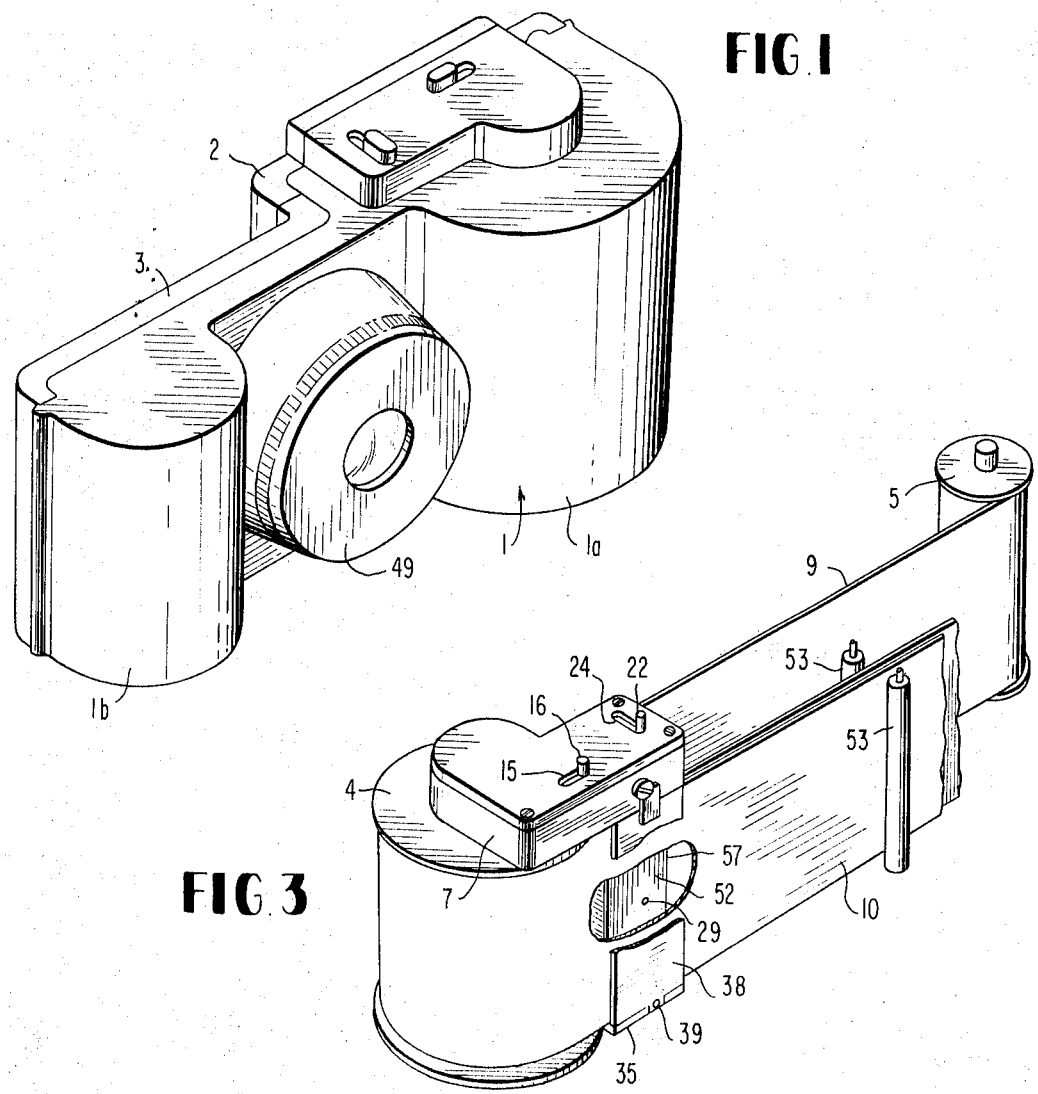
FIG. 1
FIG. 3
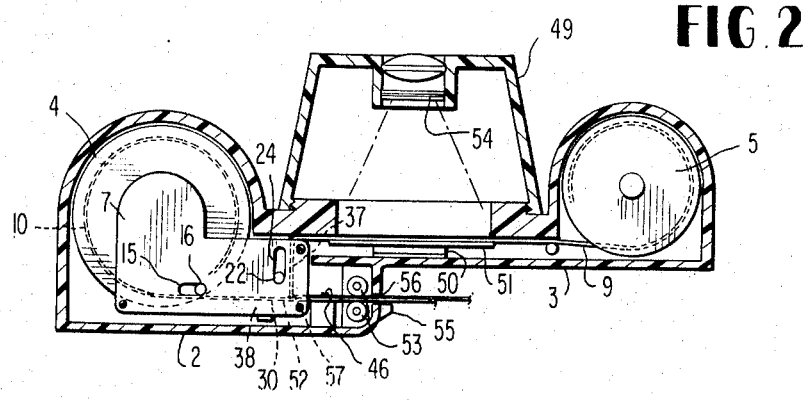
FIG. 2

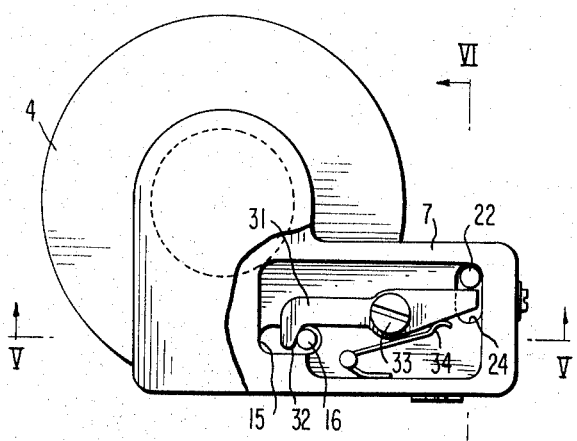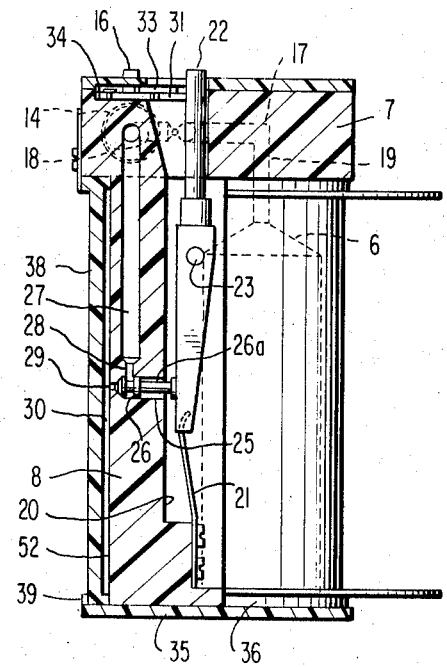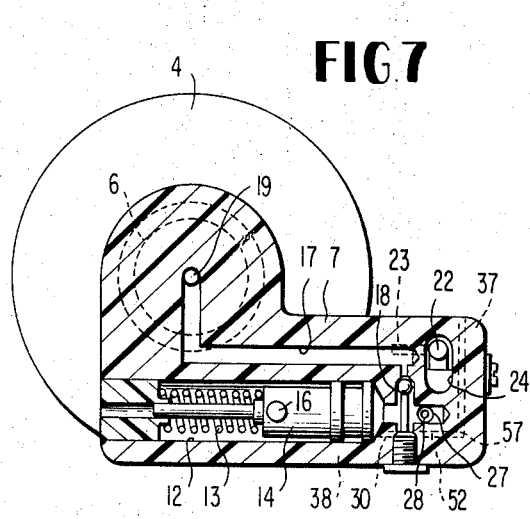

PHOTOGRAPHIC APPARATUS HAVING BUILT-IN PROCESSOR

BACKGROUND OF THE INVENTION

1. Field of the Invention

This invention relates to a diffusion transfer type photographic apparatus or a photographic camera having a diffusion transfer type photographic image processor provided therein, and more particularly to a photographic camera in which a prescribed amount of diffusion transfer processing solution is supplied to a solution container attached to a posi-sheet and a positive image is quickly developed on the posi-sheet by rolling the posi-sheet together with a negative film each time after the negative film is exposed.

2. Description of the Prior Art

One of the commonly used photographic cameras including the above-mentioned type processing means in the body thereof is the so-called Land camera, or "Polaroid" camera. This type of camera has been well known in the art as an automatic self-processing camera. Within the body of this kind of camera, there are provided a roll or sheet of negative film having a substrate of paper or film base and a roll or sheets of image forming material (hereinafter referred to as "posi-material") which has no photosensitivity and on which a positive image is formed through a diffusion transfer process. Further, a jelly-like diffusion transfer processing solution is enveloped in a small pack which, in turn, is attached to said posi material. The small pack containing the solution is usually made of paper or plastic. When one picture is taken and the paper negative film is taken up a prescribed length, the negative film is brought into contact with the posi-material prepared in the camera and roller through a pair of rolling rollers together therewith. At this time, the pack containing the processing solution is broken and lets the solution spread between the negative film (hereinafter referred to as "nega-material") and the posi-material so that the diffusion transfer development may take place and a positive image of the negative image created by the exposure may be formed on the posi-material.

SUMMARY OF THE INVENTION

This invention provides a different type of photographic cameras of the same kind as those mentioned above, in which processing solution containers are made of resilient material and have a solution supplying port. The processing solution containers are attached to the posi-material and a prescribed amount of processing solution is supplied to the container from a solution supplier device which is mounted on the camera and operable from outside. One of the features of the present invention is that a posi-spool on which a posi-material is wound and from which the posi-material is fed out is integrally formed with said processing solution supplier device and made demountable independent of the camera body.

The primary object of the present invention is to provide a photographic camera of the type wherein a positive image is formed on a posi-material through a diffusion transfer process in which the supply of the developer solution of a prescribed amount is operated from outside the camera.

Another object of the present invention is to provide a photographic camera in which the developer solution supplying device is integrally formed with the posi-spool whereby the space is saved and the camera body is made compact.

Still another object of the present invention is to provide a photographic camera in which the developer solution supplier device and the posi-spool are formed separately from the camera body and demountably loaded into the camera body so that the camera can be used easily by anyone.

A further object of the present invention is to provide a photographic camera in which the developer solution is put into a disposal container whereby there is no fear of spoiling hands or clothes with the solution which would otherwise be poured into a disposal container with the hands.

Other objects, features and advantages of the present invention will be made apparent from the following description of the preferred embodiments thereof taken in conjunction with the accompanying drawings as follows.

BRIEF DESCRIPTION OF THE DRAWING

FIG. 1 is a perspective view of a photographic camera including a diffusion transfer processing machine in accordance with an embodiment of the present invention, FIG. 2 is a horizontal sectional view of the photographic camera in accordance with the present invention as shown in FIG. 1, FIG. 3 is a perspective view showing an essential part of the photographic camera in accordance with the invention, FIG. 4 is an enlarged plan view partly in section of the processing solution supplier device and a posi-spool.

FIG. 5 is a sectional elevational view in large scale showing the section along the line V—V of FIG. 4, FIG. 6 is a vertical sectional view showing the section along the line VI—VI of FIG. 4, FIG. 7 is a horizontal sectional view showing the section along the line VII—VII of FIG. 5.

PREFERRED EMBODIMENT OF THE INVENTION

Figure 8:
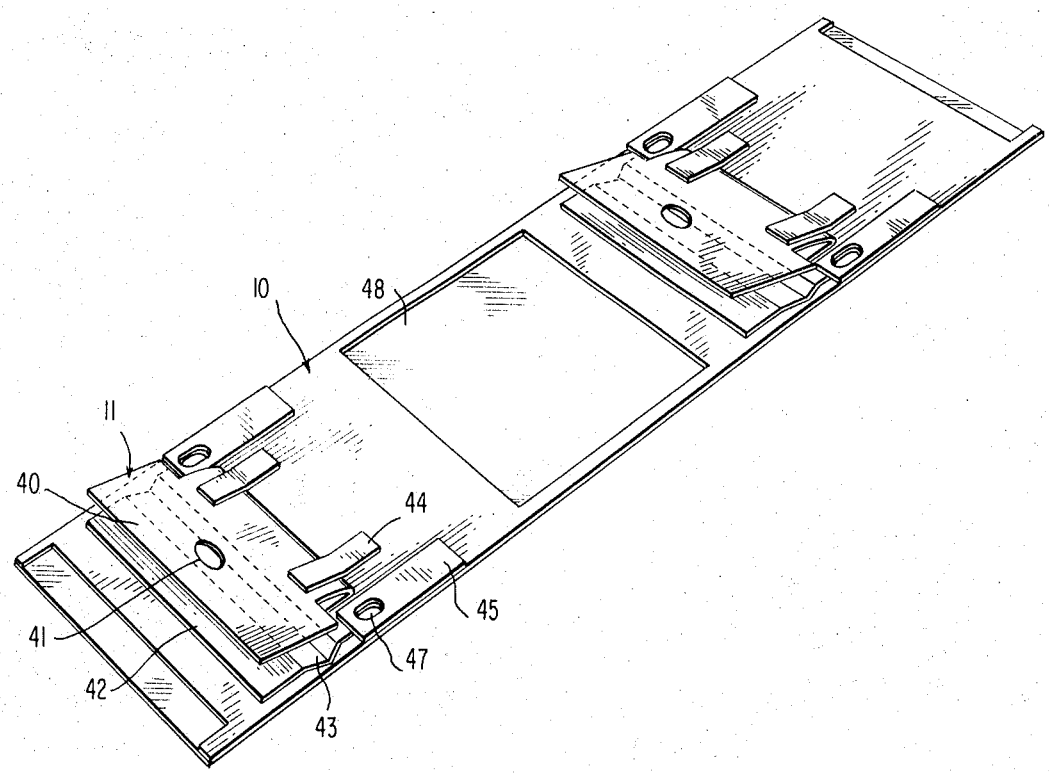
FIG. 8 is a perspective view showing a part of the posi-material employed in the present invention.

Referring now to FIG. 1, a camera body portion 1 is provided with back covers 2 and 3 for closure of the back side of the body portion 1. The camera body portion 1 has a large posi-material chamber 1a and a smaller nega-material chamber 1b at the opposite sides thereof. On the top wall of the body portion at the posi-material chamber 1a, an upper block portion 7 of a solution supplying block is mounted. The reference numeral 49 indicates a dark chamber portion of the camera body portion 1.

The processing solution supplying block is constituted by the upper block portion 7 and a lower block portion 8 as shown in FIG. 5. In the posi-material chamber 1a is provided a posi-spool 4, and in the nega-material chamber 1b is provided a nega-spool 5 as shown in FIG. 3. A tubular solution vessel 6 is demountably inserted in the posi-spool 4 and the solution therein is supplied to solution containers 11 (FIG. 8) of a posi-material 10 by said block 7 and 8. The block 7 and 8 is integrally formed with the posi-spool 4. In the upper block 7 is provided a cylinder device for supplying a prescribed amount of processing solution or developer solution within the solution vessel 6 to the lower block 8, and in the lower block 8 is provided an injecting cylinder for supplying the solution therein into the container 11 of the posi-material 10, as seen in FIG. 8.

The prescribed amount supplying device provided in the upper block 7 is well shown in FIGS. 5 and 7. In a horizontal cylinder 12 having a predetermined length in the block 7, a piston 14 is slidably provided which is normally pushed in one direction by means of a spring 13. The piston 14 is provided at an end portion thereof with an operation rod 16 fixed thereto and projected outward through an elongated hole 15 provided on the internal surface of the cylinder 12 so that the piston 14 may be moved manually. The block 7 is further provided with a passage 17 for introducing the processing solution into the cylinder 12. In the communicating portion between the passage 17 and the cylinder 12 is a check valve 18. The open end 19 of said passage 17 is located on the central axis of the posi-spool 4. The lower block 8 integrally fixed to the end of the upper block 7 has a sectional configuration as shown in FIG. 7 with broken lines and has a vertical groove 20 as shown in FIG. 6. In the vertical groove 20, a solution injecting lever 22 is rotatably mounted on a pin 23 and is normally biased in one direction by means of a spring 21 therein. The upper end of the lever 22 is projected upward out of the surface of the block 7 through a slot 24 provided in the upper block 7. The lower end portion of the injecting lever 22 is provided with a rod 26a (best seen in FIG. 6) of a piston 26 slidably inserted into the injecting cylinder 25 which, in turn, is provided in the lower block portion 8. The cylinder 25 and the passage 17 of the upper block portion 7 communicate with each other through a vertical passage 27 provided in the lower block portion 8 and a communicating hole 28 connected at the lower end thereof. The end of the cylinder 25, which is a solution discharging opening 29, opens into a passage 30 for the posi--material. The size of the discharging opening 29 is made small and the end of the piston 26 is made cone-shaped so that the end of the cylinder 25 may serve as a stopper for the piston 26 and at the same time increase the seal effect by cooperating with the end of the piston 26. On the surface of the upper block portion 7, an engaging lever 31 having at one end thereof a hook 32 for holding the operation condition of the solution supplying piston 14 is pivotally mounted on a pin 33 and normally urged counter-clockwise by means of a spring 34 as clearly shown in FIG. 4. The other end of the engaging lever 31 is engaged with the upper end of the solution injecting lever 22 as shown in FIG. 4.

The operation of the engaging lever 31 will now be explained with reference to FIG. 5. When the piston 14 is moved leftward overcoming the spring force of the spring 13, the hook 32 of the engaging lever 31 is pushed away to rotate the engaging lever 31 clockwise against the force of the spring 34 at first. Then, upon further movement of the piston 14 leftward, the operating rod 16 is moved away from the hook 32 and the hook 32 returns to its original position by passing over the circumferential surface of the operating rod 16. Thus, the operating rod 16 is held in its leftmost position in the slot 15 by the hook 32, which has returned to its original position. Then, by pushing the solution injecting lever 22 backward, that is, leftward in FIG. 6, overcoming the force of the spring 21, the engaging lever 31 is rotated clockwise, overcoming the spring 34, and the operating rod 16 is released to return to its rightmost position. Thereafter, by releasing the solution injecting lever 22, the lever 22 is returned to its original position by means of the spring 21.

The processing solution vessel 6 is fixed on a bottom plate 35 of the same shape as that of the upper block 7 by way of a receiving plate 36 as shown in FIG. 5. The upper end of the solution vessel 6 is demountably inserted into the opening 19 of the upper block 7. In order to fix the solution supplying device to the posi-spool 4, the upper end of the posi-spool is first mated with a receiving member 36a fixed to the upper block 7, and then the solution vessel 6 is put into the posi-spool 4, and finally a bent sliding plate 37 and pressure plate 38 which forms passages for the nega-material 9 and the posi-material 10 are put aside the block portions 7 and 8 and the bottom plate 35 is secured to the lower block portion 8 by means of a pin 39. After fixing the solution supplying device to the posi-spool 4, the posi-spool is loaded into the camera body 1 by opening the back cover 2 of the camera. The nega-spool 5 is put into the camera by opening the other back cover 3 of the camera body. The back covers 2 and 3 are hinged at the two side edges of the back side of the camera, respectively so that the posi and nega material can be easily loaded into the camera body 1.

Referring to FIG. 8, the posi-material employed in the present invention is provided with a development solution container 11 for each frame of images. The container 11 comprises a folded sheet consisting of an upper leaf 40 provided with an opening 41 and a lower leaf 42 having a V-shaped solution storing groove 43 extending perpendicular to the direction of advancement of the posi-material 10. The folded sheet is made of resilient material such as celluloid which recovers its original shape after release of any external force exerted thereon. The folded sheet 11 is attached to the surface of the posi-material by means of adhesive tapes 44. It will be understood that the construction of the solution containers attached to the posi-material 10 is not limited to the embodiment shown in FIG. 8 and described hereinabove. The reference numeral 45 indicates a stopper piece provided with a stop hole 47 into which an engaging pawl 46 of the camera engages. The engaging pawl 46 provided in the camera body (shown in FIG. 2) stops the posi-material 10 when the posi-material 10 is fed thereon. Once the stop hole 47 is released from the engaging pawl 46, the posi-material 10 is allowed to advance until the next stop hole 47 comes to the engaging pawl 46. The area shown at 48 in FIG. 8 is an effective image area on which a positive image is formed.

The opening 41 of the solution container 11 comes in alignment with said developer solution discharging opening 29 provided in the slide surface of the lower block portion 8. The posi-material 10 is pressed against the slide surface of the lower block 8 by means of said pressure plate 38. The nega-material 9 is pressed against the back surface of the dark chamber 49 by means of a pressure plate 51 pressed thereon by a spring 50 provided in the internal wall of the camera body 1 as shown in FIG. 2. The posi-material 10 is brought into contact with the nega-material 9 at the end of the slide surface 52 after passing through the passage 30, and then passes through a pair of rolling rollers 53 and 53. The rolling rollers 53,53 are rotatably fixed to the camera body. The reference numeral 54 indicates a shutter and 55 indicates a cutter for cutting the posi- and nega-materials in FIG. 2.

In operation of the above described embodiment of the present invention, when the solution supplying piston 14 is moved leftward by means of the operating rod 16 manually, the check valve 18 is opened and the developer solution in the solution vessel 6 is introduced into the horizontal cylinder 12 and the vertical hole 27 of the lower block portion 8. Then, since the operating rod 16 is held in its leftmost position by the hook 32 returned to its original position, as mentioned hereinbefore, the piston 14 is held in its operating condition at the left position. It will be understood that, at this moment, the solution is not yet projected out because the communicating hole 28 to the injecting cylinder 25 is still closed by the protrusion piston 26. Then, when the upper end of the solution injecting lever 22 is pushed leftward in FIG. 6, the discharging opening 29 and the communicating hole 28 are opened by the movement of the piston 25, and at the same time the engaging lever 31 is rotated clockwise by the injecting lever 22, whereby the engagement of the operating rod 16 is released and the supplying piston 14 moves rightward by means of the spring 13. Thus, the solution within the cylinder 12 and the communicating hole 27 is ejected out of the discharging opening 29 and into the V-shaped groove 43 of said solution container 11 of the posi-material 10. At this moment, the check valve 18 is automatically closed by the internal pressure of the supply piston cylinder 12 to prevent the returning of the solution back into the solution vessel 6. Then, when the solution injecting lever 22 is released, it returns to its original position by the effect of the spring 21. Further, since the remaining solution in the cylinder 25 is removed by the backward movement of the piston 26, it is ensured that accurately prescribed amount of solution will be fed into the V-shaped solution container of the posi-material. When the solution injecting lever 22 is completely returned to its initial position, the oxidization of the solution is prevented because the communicating hole 28 is closed by the piston 26.

Thereafter, the engagement between the stop holes 47 and the engaging pawls 46 is released by an external operation, and the end of the nega and posi-materials is pulled out of a pull-out opening 56. (See FIG. 2). As the nega-material 9 and the posi-material 10 are pulled out, the developer solution filled in the container 11 moves along the slide surface 52 and comes into contact with the nega-material 9 when it comes up to the merging portion 57. As the materials 9 and 10 are further pulled out, the solution is applied uniformly over the surface of the nega-material 9 as both materials are rolled between the rolling rollers 53,53. Thus, the diffusion transfer process of the image development is conducted on the posi-material 10. When both materials 9 and 10 are pulled out a predetermined length, the engaging pawls 46 come into the stop holes 47 provided on the posi-material 10 and make the materials stop. Finally, the materials 9 and 10 are cut with the cutter 55, leaving the pull-out end portion protruding for subsequent pulling out.

What is claimed is:

1. A photographic apparatus having a built-in processor of the diffusion transfer type comprising:

a first piston cylinder for supplying a developer solution in which a piston is normally urged in the direction for supplying the solution, said piston being movable from its normally urged position to a retracted position;

a second piston cylinder for injecting said developer solution, one end of which piston cylinder is opened into a passage for an image forming sheet material, said second piston cylinder containing a piston which is normally urged to close said second piston cylinder but which is movable from its normally urged position to a retracted position;

said first and second piston cylinders being provided in a block member which is fixed to a spool for winding said image forming sheet material;

a developer solution vessel provided in said spool and demountably mounted to said block member; and a check valve operable in response to the operation of said first piston cylinder and located between said first piston cylinder and said solution vessel, whereby a prescribed amount of said solution is applied to said image forming sheet material by an operation of said piston cylinders from outside the apparatus.

2. A photographic apparatus having a built--in processor as defined in claim 1 wherein said first piston cylinder is provided with a first manual operating member for moving the piston therein from its normally urged position to its retracted position, said second piston cylinder is provided with a second manual operating member for moving the piston therein to its retracted position, and said first manual operating member and said second manual operating member are corelated with each other so that the manual operation of said second manual operating member makes said first manual operating member return to its normally urged position from its retracted position.

3. A photographic apparatus as defined in claim 2 wherein said first manual operating member and said second manual operating member are corelated with each other by means of a lever pivotally mounted on said block member.

4. A photographic apparatus as defined in claim 3 wherein said second manual operating member is urged to its normal position to close said second piston cylinder.

5. A photographic apparatus as defined in claim 4 wherein said lever has a means for holding said first manual operating member in its retracted position while keeping said second manual operating member in its normal position to keep said second piston cylinder closed.

6. A photographic apparatus as defined in claim 5 wherein said lever is rotated to release said first manual operating member from its manually brought position by manually operating said second manual operating member, whereby the solution is forced out of said first piston cylinder into said second piston cylinder.

7. A photographic apparatus as defined in claim 1 wherein said first piston cylinder is located in a portion of said block member which is nearer to the top of said photographic apparatus as said photographic apparatus is positioned during normal use than the portion of said photographic apparatus in which said second piston cylinder is located, said first and second piston cylinders are disposed horizontally as said photographic apparatus is disposed during normal use, and said second piston cylinder is located substantially at a level half of the height of the image forming material passing thereby.

* * * * *